United States Patent
Ohnemus et al.

(10) Patent No.: US 10,155,437 B2
(45) Date of Patent: Dec. 18, 2018

(54) PLANETARY GEARING DEVICE

(71) Applicant: Bayerische Motoren Werke Aktiengesellschaft, Munich (DE)

(72) Inventors: Ulrich Ohnemus, Hattenhofen (DE); Sebastian Liebert, Unterfoehring (DE); Benjamin Kluge, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 2 days.

(21) Appl. No.: 15/433,002

(22) Filed: Feb. 15, 2017

(65) Prior Publication Data

US 2017/0158041 A1 Jun. 8, 2017

Related U.S. Application Data

(63) Continuation of application No. PCT/EP2015/067336, filed on Jul. 29, 2015.

(30) Foreign Application Priority Data

Aug. 20, 2014 (DE) ........................ 10 2014 216 465

(51) Int. Cl.
*B60K 6/36* (2007.10)
*F16H 3/66* (2006.01)
(Continued)

(52) U.S. Cl.
CPC ................ *B60K 6/365* (2013.01); *B60K 6/48* (2013.01); *F16H 3/666* (2013.01); *F16H 3/725* (2013.01);
(Continued)

(58) Field of Classification Search
None
See application file for complete search history.

(56) References Cited

U.S. PATENT DOCUMENTS 6,287,234 B1 * 9/2001 Park ........................ F16H 3/666
475/286
8,562,480 B1 * 10/2013 Mellet ..................... F16H 3/725
475/317
(Continued)

FOREIGN PATENT DOCUMENTS

DE 130 02 024 A1 7/2004
DE 10 2005 010 448 A1 9/2006
(Continued)

OTHER PUBLICATIONS

International Search Report (PCT/ISA/210) issued in PCT Application No. PCT/EP2015/067336 dated Oct. 20, 2015 with English-language translation (six (6) pages).
(Continued)

*Primary Examiner* — Colby M Hansen
(74) *Attorney, Agent, or Firm* — Crowell & Moring LLP

(57) ABSTRACT

A planetary gearing device includes a gearing input shaft, a gearing output shaft, a gearing housing, and at least a first, second and third planetary gear train, each having a sun gear, a ring gear and at least one planet gear. The planetary gear trains are centrally arranged with respect to a gearing axis and can be mutually, particularly selectively, connected with torque transmission devices. The first planetary gear train are arranged radially within the second planetary gear train. An individual sectional plane orthogonal with respect to the gearing axis intersects the first and the second planetary gear train, the first and the third planetary gear train being axially spaced from one another along this gearing axis. The first planetary gear train has at least a second planet gear.

12 Claims, 2 Drawing Sheets

(51) Int. Cl.
*F16H 3/78* (2006.01)
*B60K 6/365* (2007.10)
*B60K 6/48* (2007.10)
*F16H 3/72* (2006.01)
*F16H 3/44* (2006.01)
*B60K 6/405* (2007.10)
*F16H 57/02* (2012.01)

(52) U.S. Cl.
CPC ............... *F16H 3/78* (2013.01); *B60K 6/405* (2013.01); *B60Y 2200/92* (2013.01); *B60Y 2400/73* (2013.01); *F16H 57/02* (2013.01); *F16H 2003/442* (2013.01); *F16H 2003/445* (2013.01); *F16H 2057/02034* (2013.01); *F16H 2200/0052* (2013.01); *F16H 2200/201* (2013.01); *F16H 2200/2038* (2013.01); *F16H 2200/2043* (2013.01); *F16H 2200/2064* (2013.01); *F16H 2200/2094* (2013.01); *Y10S 903/911* (2013.01)

(56) References Cited

U.S. PATENT DOCUMENTS

| | | | |
|---|---|---|---|
| 9,080,648 B2* | 7/2015 | Ziemer | F16H 3/44 |
| 9,347,527 B2* | 5/2016 | Hwang | F16H 3/66 |
| 2004/0147357 A1 | 7/2004 | Gumpoltsberger | |
| 2006/0205552 A1 | 9/2006 | Grumbach et al. | |
| 2010/0035718 A1 | 2/2010 | Saitoh | |
| 2011/0009229 A1 | 1/2011 | Bauknecht et al. | |
| 2013/0260946 A1 | 10/2013 | Baldwin | |
| 2015/0065290 A1 | 3/2015 | Ziemer et al. | |
| 2016/0131227 A1 | 5/2016 | Beck et al. | |

FOREIGN PATENT DOCUMENTS

| | | |
|---|---|---|
| DE | 10 2008 000 429 A1 | 9/2009 |
| DE | 10 2012 207 017 A1 | 10/2013 |
| DE | 10 2013 205 073 A1 | 10/2013 |
| DE | 10 2013 202 895 A1 | 8/2014 |
| JP | 2008-75719 A | 4/2008 |
| WO | WO 2013/159987 A1 | 10/2013 |
| WO | WO 2014/127940 A1 | 8/2014 |

OTHER PUBLICATIONS

German-language Written Opinion (PCT/ISA/237) issued in PCT Application No. PCT/EP2015/067336 dated Oct. 20, 2015 (fourteen (14) pages).

German-language Office Action issued in counterpart German Application No. 10 2014 216 465.6 dated Mar. 12, 2015 (six (6) pages).

* cited by examiner

| Gear | B03<br>4th torque transm. | B05<br>5th torque transm. | K13<br>3rd torque transm. | K15<br>2nd torque transm. | K16<br>1st torque transm. |
|---|---|---|---|---|---|
| 1 |  | X |  |  | X |
| 2 | X |  |  |  | X |
| 3 |  |  | X |  | X |
| 4 |  |  |  | X | X |
| 5 |  |  | X | X |  |
| 6 | X |  |  | X |  |
| RW |  | X | X |  |  |

PLANETARY GEARING DEVICE

CROSS REFERENCE TO RELATED APPLICATIONS

This application is a continuation of PCT International Application No. PCT/EP2015/067336, filed Jul. 29, 2015, which claims priority under 35 U.S.C. § 119 from German Patent Application No. 10 2014 216 465.6, filed Aug. 20, 2014, the entire disclosures of which are herein expressly incorporated by reference.

BACKGROUND AND SUMMARY OF THE INVENTION

The embodiments of the present invention relate to a multistage planetary gearing device, as well as to a hybrid drive module having such a gearing device, and to a method of operating such a gearing device. A conventional planetary gearing device is disclosed in German Patent Document DE 10 2008 000 429 A1.

The overall space required for installing individual components in motor vehicles and particularly in passenger cars is of considerable importance. Conventional multistage planetary gearing devices having up to 9 shifting stages for the forward gears and one reverse gear are frequently obtained by the stringing together of several planetary gear trains. This results in gearing devices with many shifting stages and a large gear spread (relationship largest ratio, highest gear to smallest ratio, lowest gear). As a result of the stringing-together, such gearing devices frequently have a considerable overall length and high weight; the gear spread is divided into many small stage increments. For some motor vehicles, particularly small stage increments are not necessary, and space and weight can be saved by eliminating planetary gear trains.

It is an object of the embodiments of the present invention to provide a compact gearing device, particularly with a short axial overall length and preferably with a high efficiency. This task is achieved by the inventive planetary gearing device disclosed herein, as well as by a hybrid drive module having such a gearing device, and by a method of operating such a gearing device.

Planetary gearing devices are frequently used in motor vehicle construction for providing a plurality of gear ratios. In this case, gearing devices are known in which several planetary gear trains can be connected with one another or with the gearing housing by clutches and brakes. Different transmission ratios are characterized by different rotational speed ratios between a gearing input shaft and a gearing output shaft.

According to the embodiments of the invention, a planetary gearing device is a device which has at least a gearing input shaft, a gearing output shaft, a gearing housing as well as at least three or more planetary gear trains. These planetary gear trains are designed for guiding a driving power from the gearing input shaft to the gearing output shaft. Further, as a result of the selective connecting of different elements of the planetary gear trains (sun gear, ring gear, planetary gear carrier) with respect to one another and the selective connecting of these elements with a housing of the planetary gearing device, the rotational speed ratio can be changed in discrete steps. Such a planetary gearing device with three planetary gear trains preferably has six forward gears and one reverse gear.

As disclosed herein, a planetary gear train is a sun gear, a ring gear and at least one, preferably several planetary gears. A planetary gear train preferably has a planetary gear carrier for mounting and guiding the planetary gears. These gears are preferably designed as gear wheels. In the case of a planetary gear train, the sun gear is preferably arranged as a central gear. The planetary gears are arranged radially outside the sun gear, and the ring gear surrounds the planetary gears. A planetary gear preferable meshes with the sun gear and the ring gear (minus-type planetary gear train). A planetary gear preferably meshes with the sun gear and a further planetary gear and this further planetary gear meshes with the ring gear (plus-type planetary gear train).

As disclosed herein, a gearing input shaft is a component by means of which mechanical power (rotational speed, torque) can be fed to the planetary gearing device. The gearing input shaft is preferably designed as a hollow shaft or a solid shaft. The gearing input shaft preferably has a torque transmission device by means of which this power feeding can be interrupted.

As disclosed herein, a gearing output shaft is a component that is designed for forwarding the driving power modified by the planetary gearing device to further components. The gearing output shaft is preferably implemented as a solid shaft or hollow shaft. In a further preferred fashion, the gearing input shaft and the gearing output shaft are arranged coaxially with respect to one another.

As disclosed herein, a gearing housing is a device that at least partially or completely, particularly radially, surrounds the individual components of the planetary gearing device. The gearing housing is preferably designed for receiving the planetary gear trains, particularly for mounting the planetary gear trains. Preferably, at least individual elements of the planetary gear trains can be selectively connected with the gearing housing by means of a torque transmission device.

As disclosed herein, a torque transmission device is a device that is designed for selectively transmitting or not transmitting torque from an input side to an output side of the torque transmission device. By means of external control commands, the torque transmission device can preferably be switched back and forth between the operating mode for transmitting the torque and the operating mode for not transmitting the torque. Also preferably, torque transmission devices are brakes, clutches, free wheels, torque converters and synchronizing devices.

As disclosed herein, a sectional plane, which intersects the first and the second planetary gear train, is an imagined plane arranged perpendicular to a gearing axis. In this case, the gearing axis is the axis with respect to which the planetary gear trains are arranged centrically. In particular, this gearing axis is the axis of rotation of the gearing input shaft, preferably of the gearing input shaft and output shaft. Preferably, at least a sun gear and a ring gear are arranged rotationally symmetrically with respect to the gearing axis. Further, all sun gears and all ring gears of the planetary gear trains are arranged rotationally symmetrically with respect to the gearing axis.

As indicated above, in the case of planetary gear trains, a basic differentiation can be made between minus-type gear trains and plus-type gear trains. In this case, while the planetary gear carrier is held firm (stationary but rotatably arranged planetary gears), in the case of a minus-type wheel train, the direction of rotation reverses between the drive by way of the sun gear and the output by way of the ring gear. In the case of the plus-type gear train, the drive as well as the output have the same direction of rotation.

The present inventors found to be kinematically advantageous to construct the first planetary gear train as a so-called plus-type gear train. For this purpose, the first planetary gear train has at least one, preferably a row of first planetary gears. Furthermore, the first planetary gear train has at least one, preferably a row of second planetary gears. This first planetary gear meshes with the sun gear of the first planetary gear train, and this second planetary gear meshes with the first planetary gear as well as with the ring gear of the first planetary gear train. The ring gear of the first planetary gear train can be non-rotatably connected with the sun gear of the second planetary gear train; it is preferably non-rotatably connected; and particularly preferably, these two gears are constructed in one piece with one another.

The first and the secondary planetary gear train are arranged in the axial direction, thus, in the direction along the gearing axis, such that the sectional plane intersects the first as well as also the second planetary gear train. This sectional plane preferably intersects the regions of those planetary gear trains which participate directly in the power transmission between the planetary gear trains. In the case of a gear wheel, such a region is particularly the toothing of the gear wheel. Preferably all tooth meshings of these two planetary gear trains are situated in the sectional plane.

The first planetary gear train has a width dimension BE in the direction of the gearing axis. In this case, the width dimension preferably is the dimension of the widest gear wheel of this planetary gear train in this direction. Further preferable is the entire width of the toothings of the first planetary gear train, particularly if the gear wheels of this gear train are arranged offset with respect to one another in the direction of the longitudinal axis of the transmission. Alternatively, the second planetary gear train the width direction. Alternatively, the second planetary gear train is at least arranged at least essentially within the width dimension BE. As disclosed herein, "arranged at least essentially within the width dimension" means that the second planetary gear train is arranged within a dimension that is smaller than 2 times BE, preferably smaller than 1.5 times BE and particularly preferably smaller than 1.1 times BE.

In particular, as a result of the implementation of the first planetary gear train as a so-called plus-type gear train, as well as by the nesting of the first planetary gear train and the second planetary gear train, thus, particularly because of the fact that the second planetary gear train is arranged radially outside the first planetary gear train, a particularly reliable and axially compactly constructed planetary gearing device can be depicted.

Alternatively, the first and the second planetary gear train is arranged adjacent to the gearing input shaft. Furthermore, the third planetary gear train is arranged adjacent to the gearing output shaft. In this case, "arranged adjacent to" means that initially the first and the second planetary gear train and then the third planetary gear train are arranged in the direction of the torque flow from the gearing input shaft to the gearing output shaft. Particularly because of the fact that the first and the second planetary gear train are arranged adjacent to the gearing input shaft, a row of torque transmission devices can be arranged between the gearing input shaft and these two planetary gear trains. As a result, on the one hand, these torque transmission devices are particularly easily accessible, and the good accessibility particularly results in a short axial overall length for the planetary gearing device as a whole.

Alternatively, the planetary gearing device has five torque transmission devices. It was found that five torque transmission devices represent a sufficient number of different transmission ratios. Furthermore, particularly the small number of torque transmission devices results in a short overall length.

Preferably, a first torque transmission device is arranged between the sun gear of the third planetary gear train and the gearing input shaft. Further preferably, a second torque transmission device is arranged between the ring gear of the third planetary gear train and the gearing input shaft. Preferably, a third torque transmission device is arranged between the sun gear of the first planetary gear train and the gearing input shaft. Preferably a fourth torque transmission device is arranged between a planetary gear carrier of the first planetary gear train and the gearing housing. As disclosed herein, a planetary gear carrier is a device which is equipped for mounting at least one, preferably several planet gears. A fifth torque transmission device is preferably provided between the ring gear of the third planetary gear train and the gearing housing. As disclosed herein, torque transmission devices, which are arranged between an element of the planetary gear train and the gearing housing, may act as a brake. Here, the fourth torque transmission device and the fifth torque transmission device are preferably constructed as brakes. Further preferably, the first, second, and third torque transmission devices are designed as clutches. Also preferably, in the case of a torque transmission device constructed as a clutch, the torque is frictionally transmitted from the input side to the output side. Studies have shown that a particularly space-saving construction of the planetary gearing device is achieved as a result of the described manner of arranging the torque transmission devices.

Alternatively, the fifth torque transmission device is a form-fitting torque transmission device. A form-fitting torque transmission device preferably is a torque transmission device in which at least a portion of the torque is transmitted from the input side to the output side by means of a form-locking fit. Further, the entire torque is transmitted in a form-fitting manner. Also preferably, the fifth torque transmission device is constructed as a jaw clutch or jaw brake. Also preferably, the fifth torque transmission device is constructed as a self-locking jaw clutch or jaw brake. Particularly as a result of the further development of the fifth torque transmission device as a form-fitting torque transmission device, a particularly small overall space requirement for the planetary gearing device can be achieved, because high forces act upon the fifth torque transmission device, and a form-fitting torque transmission device, while the transmissible torque is the same, as a rule, has a smaller overall size than a frictional torque transmission device.

Alternatively, the fourth and/or preferably the first torque transmission device is a frictional/form-fitting torque transmission device. Preferably, a frictional/form-fitting torque transmission device is a torque transmission device, in the case of which, during the operation, first a frictional closure becomes effective and, after this frictional closure, thus, particularly as the operation progresses, a form-fitting closure is activated for the torque transmission. Such frictional/form-fitting torque transmission devices are particularly synchronizing devices, as known from motor vehicle transmissions. In the case of such a frictional/form-fitting torque transmission device, during the planned operation, first two friction surfaces, preferably a taper surface and a conical surface are pressed onto one another, so that the rotational speed of the input side and that of the output side can approach one another. Preferably at a correspondingly low rotational-speed difference, form-fitting elements will then engage which transmit the torque from the input side to the output side of the torque transmission device. Particularly by the use of a frictional/form-fitting torque transmission device as the fourth torque transmission device, a particularly small overall space requirement of the planetary gearing device can be obtained.

Alternatively, the non-rotatable connection of the sun gear of the second planetary gear train with the ring gear of the first planetary gear train is achieved in that these two gear wheels are connected with one another in one piece. In particular, as a result of the one-piece design of the ring gear of the first planetary gear train with the sun gear of the second planetary gear train, on the one hand, a particularly reliable connection between these two gear wheels becomes possible and, on the other hand, such a connection has a particularly low overall space requirement.

Alternatively, the teeth number ratio of the sun gear of the second planetary gear train and of the ring gear of the first planetary gear train is >1. Preferably, this teeth number ratio is >1.05, preferably >1.07 and particularly preferably >1.12. Furthermore, this teeth number ratio is <2, preferably <1.3, preferably <1.2 and particularly preferably <1.15. By the selection of the teeth number ratio, a particularly compact construction of the planetary gearing device becomes possible.

On the one hand, the teeth number of the sun gear of the second planetary gear train in relationship to the teeth number of the ring gear of the first planetary gear train has to be selected such that a sufficient region/distance between these two toothings will occur, in order to be able to, on the one hand, connect the two toothings with one another in a secure manner and, on the other hand, in order to keep the toothings as free of deformations as possible with respect to the deformations caused by the force transmission in the toothings. On the other hand, the region/distance between these two toothings should be as small as possible, in order to permit a compact construction of the planetary gearing device.

Particularly by selecting a teeth number ratio, at which the teeth number of the sun gear of the second planetary gear train is as large as or larger than the teeth number of the ring gear of the first planetary gear train, it is ensured, on the one hand, that sufficient space exists between these two toothings for the secure connection and, on the other hand, the toothings are at least largely free of deformations by operating forces.

The hybrid drive module has the inventive planetary gearing device as well as a first drive unit and a second drive unit. The first drive unit preferably is an internal-combustion engine and the second drive unit is an electromechanical energy converter. Also preferably, a first drive unit is a piston internal-combustion engine. An electromechanical energy converter preferably is a device for converting electric energy to mechanical energy (rotational speed, torque), particularly independently of the design of the energy converter (synchronous, asynchronous, direct-current, alternating-current motor/generator). Particularly the combination of the two drive units with the planetary gearing device according to the invention permits an especially space-saving construction of such a drive unit or of such a drive module.

Alternatively, in the inventive hybrid drive module, the second drive unit is, at least in sections, preferably completely arranged in the gearing housing of the planetary gearing device. Preferably "within the gearing housing of the planetary gearing device" means that the second drive unit is axially preferably partially or preferably completely arranged within the gearing housing and is radially surrounded by this housing at least in sections, preferably completely.

Alternatively, the second drive unit is arranged in a hybrid gearing housing, which has a constituent of more than 20% magnesium, and preferably consists at least mainly or completely of magnesium. Also preferably, the hybrid gearing housing is equipped for accommodating the dual mass flywheel and a further torque transmission device, particularly a frictional torque transmission device. Also preferably, the mechanical power flow of the second drive unit can be interrupted by means of a separating clutch. Preferably, a power electronic system, which is equipped for controlling the second drive unit, is arranged in or on this hybrid gearing housing. Also preferably, the hybrid gearing housing can be connected with the gearing housing.

Preferably, the second drive unit supplies its mechanical driving power to the gearing input shaft. Also preferably, an additional torque transmission device is arranged between the second drive unit and the gearing input shaft. Also preferably, the second drive unit is arranged coaxially with respect to the planetary gear trains of the planetary gearing device; the axis of rotation of an output shaft of the second drive unit preferably coincides with the gearing axis. Particularly the arranging of the second drive unit in the gearing housing of the planetary gearing device permits a particularly space-saving construction of a hybrid drive module.

Alternatively, a power electronic system, which is equipped for controlling the second drive unit, is arranged within the gearing housing of the planetary gearing device. Also preferably, "within the gearing housing with respect to the power electronic system", as disclosed herein, should also be understood in this manner when this power electronic system is accommodated in its own housing and this housing of the power electronic system is, in particular, mounted from the outside on this gearing housing of the planetary gearing device according to the invention.

In the inventive process for changing individual rotational-speed ratios of this planetary gearing device, two torque transmission devices respectively are activated for each individual rotational-speed ratio.

In the first gear of the planetary gearing device, preferably the fifth torque transmission device and the first torque transmission device are activated. As disclosed herein, an activated torque transmission device is a torque transmission device whereby a torque can be transmitted from the input side to the output side.

In the following, an engaged first gear will be assumed to be the starting situation, in which the first torque transmission device is activated and all other torque transmission devices are deactivated.

During the change from the first gear to the second gear, the first torque transmission device preferably continues to remain activated. The fifth torque transmission device is deactivated and the fourth torque transmission device is activated.

During the change from the second gear to the third gear, preferably, the first torque transmission device remains activated, the fourth torque transmission devices is deactivated and the third torque transmission device is activated.

During the change from the third gear to the fourth gear, preferably the first torque transmission device is activated, the third torque transmission device is deactivated, and the second torque transmission device is activated.

During the change from the fourth gear to the fifth gear, preferably the first torque transmission device is deactivated, the second torque transmission device remains activated, and the third torque transmission device is activated.

During the change from the fifth gear to the sixth gear, preferably the third torque transmission device is deactivated, the second torque transmission device remains activated, and the fourth torque transmission devices is also activated.

Particularly by triggering the torque transmission devices according to the described concept, an especially reliably functioning and compactly constructed planetary gearing device can be provided.

The embodiments of the invention will be further described via the following figures. Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

Figures 1, 2:
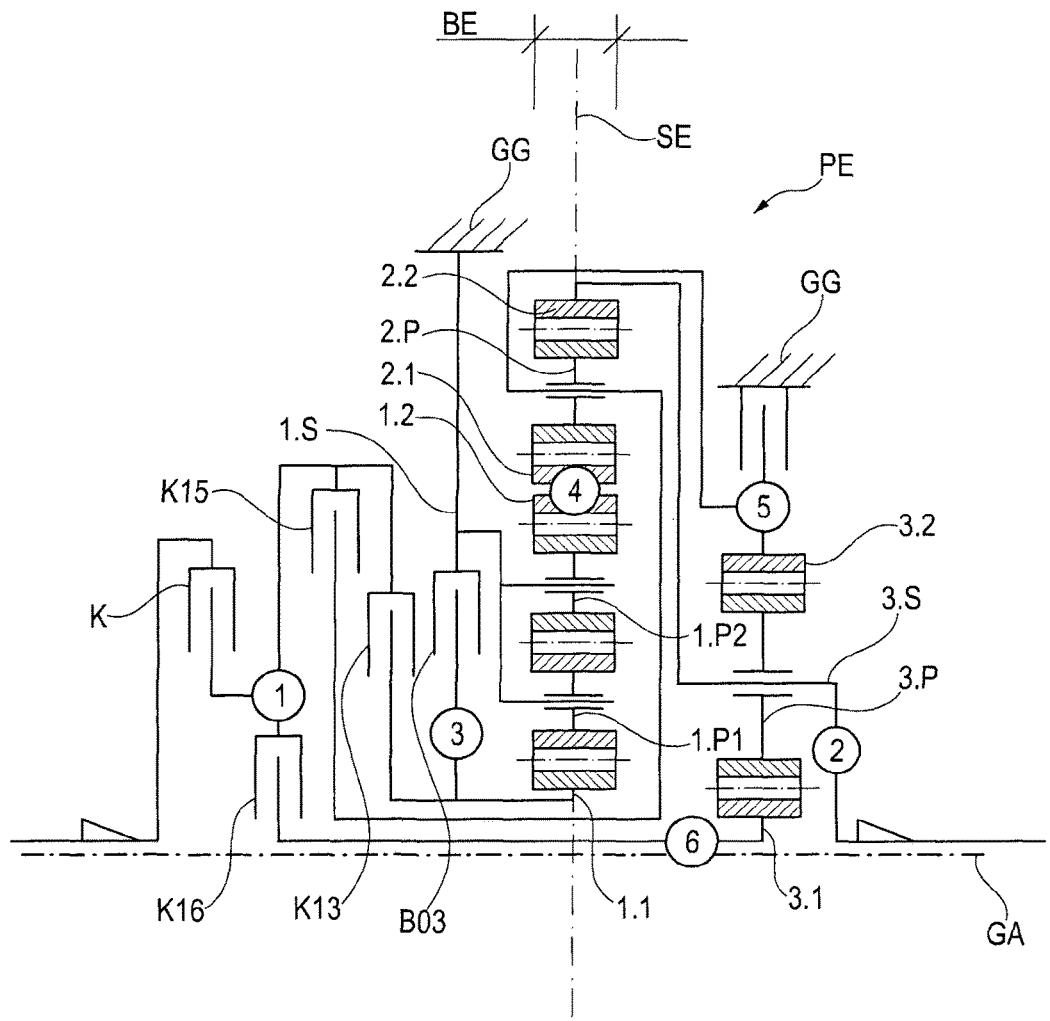
FIG. 1 is a longitudinally sectional view of the gearing diagram of the planetary gearing device.
FIG. 2 is a view of the shifting diagram of the planetary gearing device for the operating process.

FIG. 1 illustrates a planetary gearing device PE. The planetary gearing device PE has three planetary gear trains which are coaxially arranged with respect to the gearing axis GA. The planetary gearing device has a gearing input shaft 1 of a clutch K and a gearing output shaft 2 as well as a gearing housing GG.

The first planetary gear train has a sun gear 1.1, a first row of planet gears, of which only the planet gear 1.P1 is shown, and a second row of planets, of which only the planet gear 1.P2 is shown. The two planet gears 1.P1 and 1.P2 are disposed on the support (planetary gear carrier) 1.S of the first planetary gear train. The support 1S is non-rotatably connected with the gearing housing GG. The planet gear 1.P1 meshes with the sun gear 1.1 and the planet gear 1.P2 on one side meshes with the planet gear 1.P1 and with the ring gear 1.2.

The second planetary gear train has a sun gear 2.1 and a row of planet gears, of which only the planet gear 2.P is shown. The planet gear 2.P meshes with the sun gear 2.1 and with the ring gear 2.2. The gearing input shaft 1 can be connected with a drive unit (not shown) by way of a clutch K. The gearing output shaft 2 is non-rotatably connected with the planetary gear carrier of the third planetary gear train 3.S. The third planetary gear train has a sun gear 3.1 and a ring gear 3.2. The illustrated planet gear of the third planetary gear train 3.P meshes with the sun 3.1 as well as with the ring gear 3.2.

The sectional plane SE intersects the first and the second planetary gear train such that all tooth engagements are situated in this sectional plane SE. The first planetary gear train has a dimension BE in the direction of the gearing axis GA. The second planetary gear train is also arranged within this dimension BE.

By means of the first torque transmission device K16, the gearing input shaft 1 can be connected with the sun gear 3.1 of the third planetary gear train, gearing shaft 6. These and the torque transmission devices marked "K" in the following are implemented as clutches between shafts; the torque transmission devices marked "B" are implemented as brakes.

By means of the second torque transmission device K15, the gearing input shaft 1 can be connected with the ring gear of the third planetary gear train 3.2, gearing shaft 5. By means of the third torque transmission device K13, the gearing input shaft 1 can be connected with the sun gear of the first planetary gear train 1.1, gearing shaft 3. By means of the fourth torque transmission B03, the sun of the first planetary gear train 1.1, gearing shaft 3, can be connected with the gearing housing GG. By means of the fifth torque transmission device B05, the ring gear of the third planetary gear train 32, gearing shaft 4, can be connected with the gearing housing GG.

FIG. 2 shows the shifting diagram of the torque transmission devices B03, B05, K13, K15, K16 (torque transmission device 1-5) of the planetary gearing device for the six forward gears 1 to 6 and for the reverse gear RW. In the table illustrated in FIG. 2, X means that the characterized torque transmission device is activated. Accordingly, the torque transmission device B05 and the torque transmission device K16 are activated for the first gear.

Figure 3:
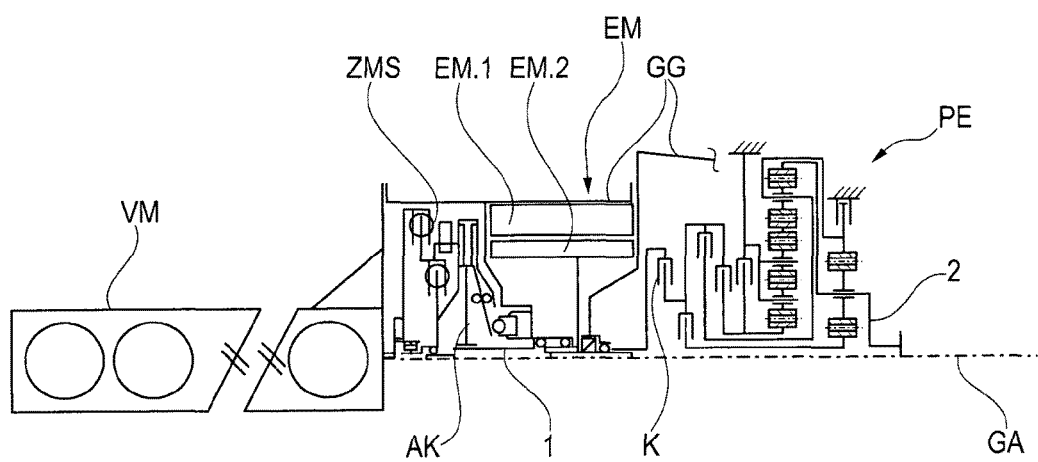
FIG. 3 is a longitudinal sectional view of the hybrid drive module.

FIG. 3 illustrates a hybrid drive module. This hybrid drive module has a planetary gearing device PE according to the invention, an internal-combustion engine VM and an electromechanical energy converter EM. In this case, the electromechanical energy converter EM is arranged in the gearing housing GG of the planetary gearing device PE. The planetary gearing device PE is equipped for accommodating by way of the gearing input shaft 1 the driving power of the electromechanical energy converter EM and of the internal-combustion engine VM and for delivering it by way of the gearing output shaft 2. The output shaft of the internal-combustion engine VM as well as of the electromechanical energy converter EM and the planetary gearing device PE are coaxially arranged with respect to the gearing axis GA. The internal-combustion engine VM can be connected by way of the separating clutch AK with the gearing input shaft 1. A dual-mass flywheel ZMS is additionally arranged between the separating clutch AK and the internal-combustion engine VM.

The electromechanical energy converter EM has a stator EM.1 and a rotor EM.2. The rotor EM.2 is non-rotatably connected with the gearing input shaft 1. The gearing input shaft 1 has an additional torque transmission device K, which is constructed as a starting clutch and permits particularly the starting of the motor vehicle from a standstill when driven by the internal-combustion engine VM.

In addition, by means of the torque transmission device K, the power flow to the planetary gearing device PE from the first and the second drive unit (VM<EM) can be interrupted. In this operating mode (K deactivated, opened; AK activated, closed), a so-called "standing charging" of the motor vehicle is made possible.

The gearing housing, which is equipped for accommodating the dual-mass flywheel ZMS, the second drive unit EM as well as the separating clutch, is designed as a hybrid gearing housing.

The arrangements of the planetary gear trains and the torque transmission devices in the planetary gearing device PE, in this embodiment (FIG. 3), correspond to the arrangement of these elements of the embodiment illustrated in FIG. 1.

The foregoing disclosure has been set forth merely to illustrate the embodiments of the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A planetary gearing device for a motor vehicle, comprising:
a gearing input shaft;
a gearing output shaft;
a gearing housing; and
a first, second and third planetary gear train, each having a sun gear, a ring gear and a first planetary gear, wherein
the first, second and third planetary gear trains are centrally arranged with respect to a gearing axis and are selectively connected with torque transmission devices,
the first planetary gear train is arranged radially within the second planetary gear train,
an individual sectional plane that is orthogonal with respect to the gearing axis intersects the first and the second planetary gear trains, the first and the third planetary gear trains being axially spaced from one another along the gearing axis,
the first planetary gear train has at least a second planetary gear,
the planetary gear of the first planetary gear train meshes with the sun gear and with the second planetary gear of the first planetary gear train,
the second planetary gear meshes with the ring gear of the first planetary gear train, and
the ring gear is non-rotatably connected with the sun gear of the second planetary gear train.

2. The planetary gearing device according to claim 1, wherein the first and the second planetary gear trains are arranged adjacent to the gearing input shaft, and that the third planetary gear train is arranged adjacent to the gearing output shaft.

3. The planetary gearing device according to claim 2, wherein the planetary gearing device has five torque transmission devices, including at least one of a brake, a clutch, a free wheel, a torque converter, and a synchronizing device.

4. The planetary gearing device according to claim 3, wherein the ring gear of the third planetary gear train is connectable with one of the five torque transmission devices with the gearing housing and the one of the five torque transmission devices is a torque transmission device in which at least a portion of the torque is transmitted from an input side to an output side via of a form-locking fit.

5. The planetary gearing device according to claim 4, wherein the gearing input shaft is connectable via the sun gear of the third planetary gear train to one of the five torque transmission devices, and the one of the five torque transmission devices is a synchronizing device.

6. The planetary gearing device according to claim 4, wherein a transmission input shaft is connectable via the sun gear of the third planetary gear train to one of the five torque transmission devices, and the one of the five torque transmission devices is a frictional torque transmission device.

7. The planetary gearing device according to claim 6, wherein the ring gear of the first planetary gear train and the sun gear of the second planetary gear train are integrally formed in one piece.

8. The planetary gearing device according to claim 7, wherein a teeth number ratio of the sun gear of the second planetary gear train and of the ring gear of the first planetary gear train is higher than 1.

9. A hybrid drive module, comprising:
a planetary gearing device according to claim 8; and
a first drive unit and a second drive unit, wherein
the second drive unit is a device for converting electric energy to mechanical energy, and the first drive unit is an internal combustion engine.

10. The hybrid drive module according to claim 9, wherein the second drive unit is arranged entirely in the gearing housing of the planetary gearing device.

11. The hybrid drive module according to claim 10, further comprising: a power electronic system, which controls the second drive unit, and is arranged within the gearing housing.

12. A process for changing the rotational-speed ratio between the gearing input shaft and the gearing output shaft of the planetary gearing device according to claim 8, wherein for activating an individual rotational speed-ratio, two torque transmission devices respectively are activated.

* * * * *